May 2, 1961 C. F. LEYSE ET AL 2,982,710
FOOD IRRADIATION REACTOR
Filed June 27, 1957 7 Sheets-Sheet 6

Inventors
Carl F. Leyse
Glen E. Putnam
By: Roland A. Anderson
Attorney

United States Patent Office 2,982,710
Patented May 2, 1961

2,982,710

FOOD IRRADIATION REACTOR

Carl F. Leyse, Manchester, Mo., and Glen E. Putnam, Lynchburg, Va., assignors to the United States of America as represented by the United States Atomic Energy Commission Filed June 27, 1957, Ser. No. 668,588

1 Claim. (Cl. 204—193.2)

This invention relates to an ionizing energy source for irradiating selected materials and more particularly to a device and process comprising a neutronic reactor for producing gamma rays usable for irradiating foodstuffs.

It is well known that ionizing radiations possess bactericidal properties which are particularly useful in the preservation of foods, sterilization of medical products and other applications. The advent of greater technology in the field of high intensity radiation sources has added radiation sterilization to the hitherto four basic methods of food preservation, namely heat processing, dehydration, refrigeration, and the use of chemicals. To adequately preserve and sterilize materials such as foodstuffs and medical products by this method, it is necessary to utilize ionizing radiations which possess sufficient energy to penetrate matter and are available in sufficient intensities to produce the desired effects. Gamma rays, particularly those available from nuclear reactor systems, are readily adaptable for use as preserving sterilizing radiations.

There are essentially four different gamma sources from a nuclear reactor system and are: (1) prompt fission gammas released in the fissioning reaction of the reactor fuel, (2) capture gammas released in the absorption of neutrons in poison materials within the reactor, (3) delayed fission product gammas released in the radioactive decay of materials formed by the nucleus split in the fissioning process, and (4) radioactive isotopes produced by the excess neutrons not necessary to sustain the chain reaction. Of these, the prompt and capture gammas are emitted practically instantaneous upon neutron absorption so that they cannot be removed for external use. The delayed fission product gammas and the radioactive isotope gammas are available subsequent to neutron absorption for a period of time dependent on the half-life of the particular materials. About 3% of reactor power appears as prompt gammas while 1 to 4% appear as capture gamma depending on the element in which the capture occurs. About 2.5% of the reactor power is displayed as delayed fission product gammas and up to 2% appears as gamma emitting radioactive isotopes produced from excess neutrons. The total gamma power available from a reactor theoretically approaches 12% of its total heat power; however, in most practical cases it is only about 1%. Of the available 1% perhaps 10% is finally absorbed in the material being irradiated.

It is therefore an object of this invention to provide a nuclear reactor system for supplying ionizing radiations for the preservation and sterilization of selected materials wherein optimum use is made of the energy radiations produced therein.

This invention also relates to a nuclear reactor system for irradiating foodstuffs and medical supplies wherein gamma radiation energies are produced by the absorption of excess neutrons in the reactor into an emitter material introduced therein which forms radioactive isotopes, the emitter material being removable to the exterior of the reactor where it is used to irradiate the materials. When fission occurs in a neutronic reactor about 2.5 neutrons, on the average, are liberated. To maintain a critical reactor 1.18 of these neutrons need to be absorbed in the fissionable material. A minimum of about .25 neutrons must be lost by absorption in the core structure material and coolant. Approximately .25 neutrons leak out of the entire system, mostly as fast neutrons and thus some .8 neutrons per fission are available for absorption in the emitter material. The emitter material may be formed in a blanket around the reactor core in such a manner that the absorption characteristics thereof will not affect the reactivity of the core itself.

It is thus another object of this invention to provide a reactor system for irradiating food stuffs and medical supplies wherein the utilization of reactor power to form the ionizing radiations has no substantial effect upon the reactivity of the reactor thereby providing a maximum range of variations without affecting the stability of the reactor.

It is a third object of this invention to provide a reactor for use in a system for irradiating foodstuffs and medical supplies wherein a maximum number of excess neutrons are available for absorption in the emitter blanket to release gamma radiations.

These and other objects are obtained by the novel construction, combination of materials, and arrangement of said materials hereinafter described and shown in the accompanying drawings in which.

The irradiation facility described in detail hereinbelow and illustrated in the attached drawings has been designed for the express purpose of irradiating foodstuffs and consists of a highly enriched, light-water cooled and moderated heterogenous reactor core surrounded by a blanket of an aqueous solution of an indium$^{115}$ salt such as an indium sulphate, indium chloride or indium nitrate, an indium solution system including the reactor blanket and the gamma irradiators, and primary and auxiliary cooling water systems for removal of reactor heat. The reactor core is preferably of cylindrical shape having its length substantially greater than its diameter. This arrangement maximizes neutron leakage for absorption by the indium.

Figures 2, 3:
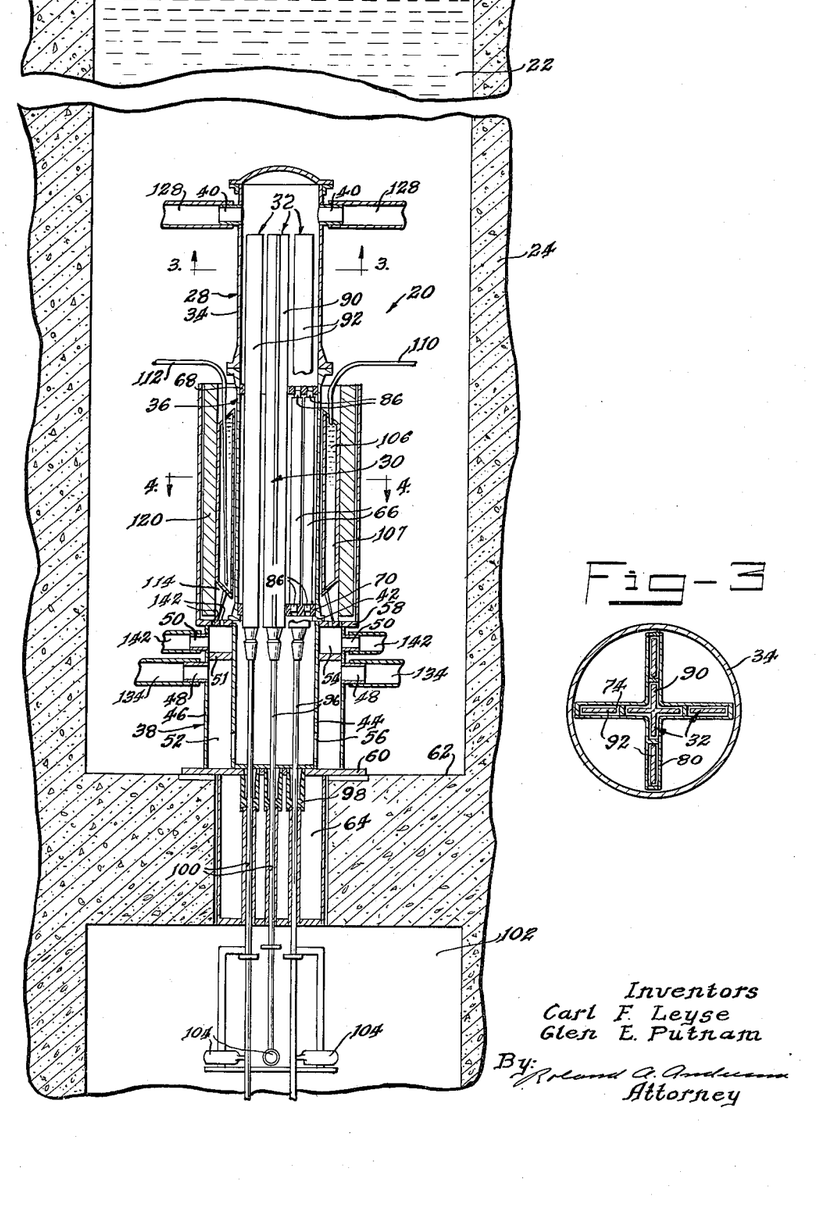
Figure 2 is a vertical sectional view of the neutronic reactor showing the internal components therein.
Figure 3 is a horizontal sectional view taken along the line 3—3 of Figure 2 showing the arrangement of the control rods for the reactor.

As shown in Figure 2, the reactor 20 is disposed within a tank 22 formed by a concrete biological shield 24 and is submerged by a water coolant 26 therein. The reactor 20 comprises an elongated tubular pressure vessel 28 housing the active portion 30 and control elements 32. The reactor vessel 28 is an assembly of three separate units, namely an upper tank 34, a center tank 36, and a lower tank assembly 38. The upper tank 34 is a hollow cylinder having a cover dome at its upper end with two outlets 40 for the passage of coolant therethrough. The center tank 36 is a tubular element fabricated of a thermal neutron permeable material such as aluminum and has an inside flange 42 around its lower end which supports the core structure 30. The lower tank assembly 38 consists of two concentric tubes, an inner one 44 and an outer one 46. A pair of inlets 48 and a pair of outlets 50 are disposed near the upper end of the outer tube 46 with a baffle ring 51 positioned in the interstice between the inner tube 44 and outer tube 46 to form separate chambers 52 and 54 communicating with the inlets 48 and outlets 50, respectively. Orifices 56 are formed near the lower end of the inner tube 44 forming passages for coolant to flow between the chamber 52 and the inside of the tube 44. The center tank 36 and the lower tank 38 are joined by an annular plate 58 to which both are welded. The lower end of the lower tank 38 is welded to annular plate 60 which supports the pressure vessel 28 on the platform 62 over a lead shot shield plug 64.

In one particular construction of a neutronic reactor used to illustrate the present invention throughout this description, the pressure vessel 28 is approximately 12 feet long, the center tank 36 surrounding the active portion 30 being a 50" long tubular shell having an 18.5" O.D. 17.75" I.D. The upper and lower tanks 34 and 38, respectively, are constructed of stainless steel to resist corrosion by the coolant fluids. The inner tube 44 of the lower tank assembly 38 has an inner diameter of 19.250", the outer diameter of the outer tube 46 being 32.25".

REACTOR CORE ASSEMBLY

The reactor core assembly or active portion 30 consists of fuel assemblies 66 supported by upper and lower grids 68 and 70, respectively, control rods 32, an assembly of thermal neutron permeable filler blocks 72 (Figure 4) and rod guides 74. The fuel assemblies 66 are arranged in what may be called a staggered square loading with the filler blocks 72 filling the space between the center tank 36 of the pressure vessel 28 and the fuel assemblies 66. It is to be understood that a maximum neutron flux leakage from the active portion 30 of the reactor is desirable and is accomplished by using a fuel assembly array geometrically shaped to have a substantially large surface to volume ratio. The length of the active portion 30 should be greater than its diameter and ideally over two times as great. The fuel assemblies 66 are supported by the lower grid 70 which rests upon the flange 42 at the bottom end of the center tank 36. The fuel assemblies 66 are held in place at their upper end by the upper grid 68 which is supported around its periphery by the filler blocks 72 and bolted thereto. The filler blocks 72 are held in position by means of bolts 76 extending downward therethrough and threadedly engaging the center tank flange 42. A gap 78 between the pressure vessel 28 and the filler blocks 72 serves as a passage for the flow of coolant. Flat plates 80, together with spacer blocks 82, are disposed within the core 30 to form the control rod guides 74.

Figure 4:
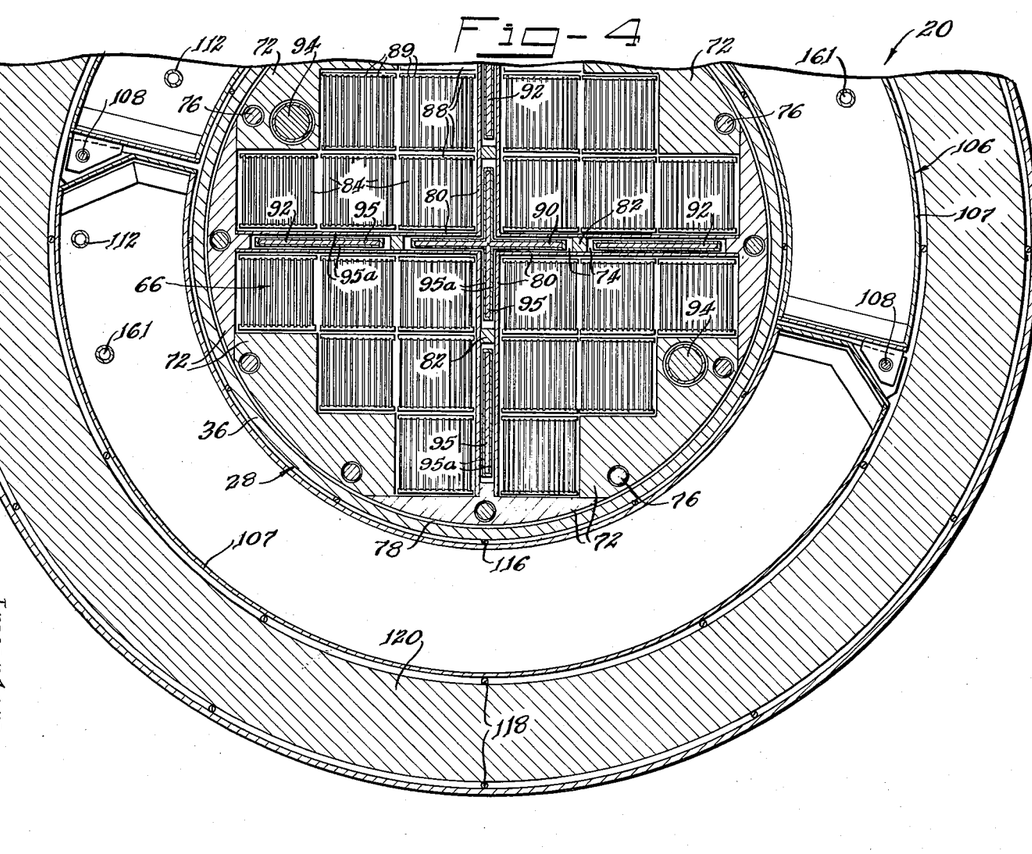
Figure 4 is a horizontal sectional view taken along the line 4—4 of Figure 2 showing the arrangement of the active core within the reactor.

In the particular reactor described herein, the upper and lower grids 68 and 70, filler blocks 72, bolts 76, plates 80 and spacer blocks 82 are all fabricated of aluminum to reduce the parasitic capture of thermal neutrons within the active portion 30. The filler blocks 72 are approximately 38.50" long and are assembled so that their outside surfaces describe a 17⅝" diameter cylinder which fits into the center tank 36 with a 1/16" annulus therebetween for the flow of coolant. The upper and lower grids 68 and 70 are constructed so that 24 fuel assemblies 66 are situated in the core 30 in the described array with a center-to-center distance of 2.50" between adjacent assemblies. However, the center-to-center distance between fuel assemblies on either side of the rod guides 74 is 3.1875", the rod guides measuring .6015" thick overall and plates 80 being 0.102" thick.

FUEL ASSEMBLIES

The fuel assemblies 66 in the active portion 30 are of the flat plate type construction similar to the fuel assemblies disclosed in the co-pending application of Eugene P. Wigner, S.N. 314,595, filed October 14, 1952, now Patent No. 2,831,806, issued April 22, 1958. The fuel assemblies 66 of this invention differ therefrom only in that the fuel plates 84 are flat rather than curved, end boxes 86 (Figure 2) both have rectangular cross sections and the assemblies are not enclosed in a covering as shown in the co-pending referenced application. Plates 84 of material fissionable by thermal neutrons are clad with a corrosion resistant material and secured to side plates 88. The side pieces 88 have longitudinal grooves 89 and extend in either direction beyond the length of the fuel plates 84 where they are connected to the rectangular cross section end boxes 86 which secure them in the upper and lower grids 68 and 70, respectively. In the construction of the particular neutronic reactor illustrating the present invention, the plates 84 are fabricated of an aluminum-uranium alloy of approximately 31.6 weight percent uranium enriched between 90 and 95%, each plate measuring .050" thick, 2.372" wide and 37" long and clad with 15 mil aluminum. The side pieces 88 are .098" thick aluminum plates having 16 longitudinal grooves to receive 16 fuel plates 84 spaced 0.106" apart for the flow of coolant therebetween. The width of the side pieces is 2.460" and the grooves are so cut that the finished fuel assembly 66 has a square cross section, each side measuring 2.460". With the above construction of the fuel assemblies 66 the metal-to-coolant ratio of an individual assembly is 0.58 and the overall metal-to-coolant ratio for the core is about 0.7 including the control rods which will be hereinafter described.

CONTROL RODS

As seen in Figure 4, the control rods 32 consist of a cruciform cross section shim rod 90, four plate-type shim rods 92 and two cylindrical regulating rods 94. Each of the shim rods 90 and 92 is constructed having a thermal-neutron absorbent core 95 enclosed in a non-corrosive, thermal-neutron permeable cladding 95a at the upper end, and a solid rod of the cladding material at its lower end so that it will be transparent to the fission reaction when it is in its raised position and will act as a poison to the reaction when in its lower position. Each of the regulating rods 94 is a solid bar of thermal-neutron permeable material at the lower end with an airfilled thermal-neutron absorbent tube clad with a non-corrosive, thermal-neutron permeable material at the upper end.

In the particular reactor described, the shim rod 90 has a cruciform cross section measuring 2.5" from the longitudinal axis of the rod to the blade tips. The upper part of the rod 90 is formed of .062" thick cadmium which is sandwiched between .102" thick aluminum sheets, the assembly being fusion welded to form a watertight plate assembly. The lower end of the shim rod 90 is a cruciform cross sectioned rod of solid aluminum. The plate shim rods 92 are similarly fabricated of .062"

thick cadmium sandwiched between 0.102" thick aluminum sheets and fusion welded, the lower end being a solid aluminum bar. The cadmium section in the shim rods 90 and 92 are 36" long while the lower sections which are entirely aluminum are approximately 47" long. The upper section of the regulating rod 94 is an aluminum clad cadmium tube having a 1.375" O.D., .062" thick and approximately 24" long, the cladding being .0625" thick. The lower section is a solid beryllium rod 36" long.

Each of the shim rods 90 and 92 and the regulating rods 94 have extensions 96 (Figure 2) at their lower end extending through shock absorber housings 98 and channels 100 through the lead shield plug 64 to a space 102 below the reactor which houses the control rod driving mechanism. Each of the control rods 32 has its own motor 104 drivingly connected thereto through suitable clutch and gear means. Each of the rods is separately controllable and the shim rods 90 and 92 are responsive to a power surge of the reactor so that they will drop under the force of gravity so that the cadmium sections will be inserted into the active portion 30 of the reactor. The clutch and gear means and the separate control means are not shown as they are well known in the art of reactor engineering and form no part of the presently claimed invention.

IRRADIATION BLANKET

Surrounding the pressure vessel 28 around its active portion 30 is an annular container or blanket 106 in which flows a fluid capable of emitting gamma rays upon the absorption of neutrons emanating from the active portion 30. The blanket 106 is formed of two semicircular tanks 107 held together by piano-type hinges 108 (Figure 4), each tank 107 having its ends tapered away from the reactor vessel 28 to facilitate the flow of coolant therearound. The blanket fluid is introduced into each of the tanks 107 through pipes 110 and is removed therefrom by means of pipes 112. The blanket 106 is supported by footings 114 maintaining it at a spaced relationship above the annular plate 58. The blanket 106 is also spaced from the pressure vessel 28 by means of spacer wires 116 so that coolant may flow therebetween.

In the particular reactor described, the tanks 107 each have 1/8" stainless-steel walls forming a 4" wide space for containing the fluid so that the total volume of the tanks is approximately 5.3 cubic feet. An aqueous indium sulphate solution of up to 600 grams per liter concentration flows through the tanks 106 and is used to irradiate the selected materials as hereinafter described.

Surrounding the indium blanket and separated from it by spacer wires 118 is a thermal shield 120 formed of a neutron absorbing material which serves to reduce the gamma heat dissipated in the reactor water coolant pool 26 and concrete shield 24 by absorbing the neutrons escaping the blanket 106. A 3" thick 48" long stainless clad carbon steel tube with a 1/8" water annulus between the tube and the blanket is used in the particular reactor described, serving to reduce the heat of the shielding pool and concrete biological shield.

COOLING SYSTEMS

Figure 1:
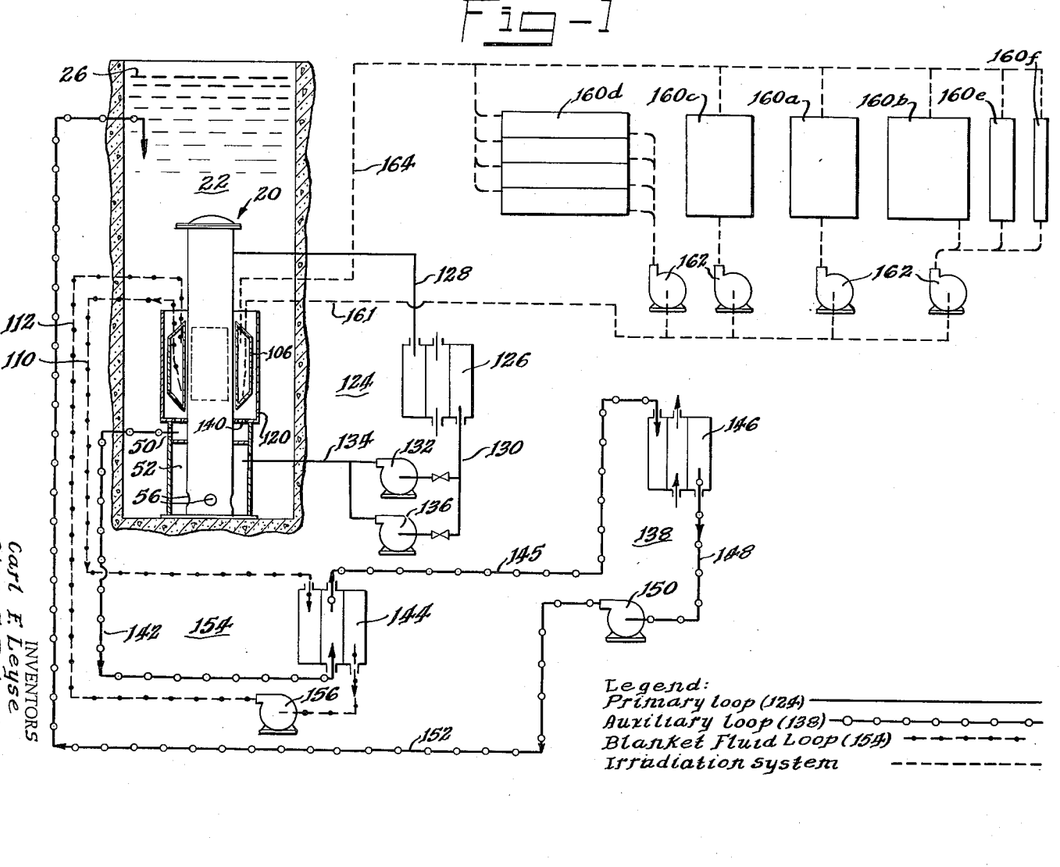
Figure 1 is a schematic drawing of the reactor system showing the reactor and its relationship with the cooling system and the food irradiation facilities.

The schematic flow diagram of the cooling systems for the reactor is shown in Figure 1 of the drawings. The reactor heat is removed from the active portion 30 within the pressure vessel 28 by means of a primary coolant loop 124. The primary coolant is drawn through the reactor from the chamber 52 through orifices 56 and upward through the hollow fuel assemblies 66 and the upper shell 34 of the pressure vessel 28 to the coolant outlets 40. The coolant is transmitted to the heat exchanger 126 by pipe means 128 where the heat is extracted and deposited to the atmosphere in a manner well known to the art. The coolant is withdrawn from the heat exchanger 126 through pipe means 130 to the suction end of primary coolant pump 132 and is returned to the reactor by means of pipe means 134 to coolant inlet 48. A second cooling pump 136 is connected parallel to the primary coolant pump 132 to operate during shutdown periods of the reactor. The primary coolant system for the particular reactor described is designed to keep the temperature of the hottest fuel plate surface within the core below approximately 366° F. A 2460 gallon per minute device is used as the primary pump 132 to circulate the water coolant at a velocity of 7.5' per second through the core at a pressure of approximately 150 p.s.i.g. The shutdown pump 136 has a capacity of approximately 50 gallons per minute which is adequate to dissipate heat liberated from any residual nuclear reactions in the active portion.

An auxiliary coolant loop 138 is provided to cool the blanket annular tank 106, the thermal shield 120, and the pressure vessel 28. This heat is removed by the water coolant 26 flowing downward through the annuli provided at the outer surface of the reactor vessel, between the annular tank 106 and the thermal shield 120 and around the outer surface of the thermal shield. The water is drawn through apertures 140, chamber 54, and outlets 50, through pipe means 142 and blanket coolant heat exchanger 144, through pipe means 145 to the auxiliary system heat exchanger 146, wherein the heat is removed from the water coolant and distributed to the atmosphere by conventional means. The coolant flows from the discharge end of the heat exchanger 146 by means of the pipe 148, to the intake of the auxiliary coolant pump 150 which feeds the coolant back into the tank 22 by means of the pipe 152. In the particular reactor described, a 430 gallon per minute capacity auxiliary cooling pump is used to flow water through the various annuli at a velocity of between 3.5 to 5.5' per second, the entrance temperature of the water to the annuli being approximately 100° F., the mixed mean exit temperature being approximately 110° F.

The fluid in the blanket annular tank 106 is cooled by a separate loop 154 wherein the fluid is removed from the annular tank 106 through pipe 110 and transmitted to the heat exchanger 144. The heat is removed from the blanket fluid by the water coolant of the auxiliary loop 138 which flows therethrough as previously described. From the heat exchanger 144, the blanket fluid goes to the suction end of the blanket fluid pump 156 and thence back to the annular tank 106 through pipe 112. To maintain a blanket fluid temperature below the maximum limit of 180° F. and within a normal operating range of 150° F. to 160° F., a 150 gallon per minute capacity pump is used. The total volume of blanket fluid in the loop 154 is approximately .7 cubic feet.

IRRADIATION SYSTEM

The fluid in the blanket 106 is used to irradiate the selected materials by pumping it through specially designed irradiators 160a through 160f, and returned to the blanket. The irradiation fluid is withdrawn from the blanket 106 by means of tube 161 and distributed to the suction side of the pumps 162. The fluid is forced through the irradiators 160a through 160f and returned to the blanket tank 106 through pipe means 164.

We have discovered that an aqueous indium sulphate solution of up to 600 gms. per liter concentration using indium [115] is ideal for use as the blanket fluid in a circulatory system with a neutronic reactor because of the relatively high absorption cross section for thermal neutrons of 190 barns and the moderately short 54 minute half-life of the radioactive isotope indium [115]. Indium [115] also emits an ideally suited spectrum of gamma energies while the moderating properties of the water in the solution adapt the fluid for utilizing the fast neutrons escaping the active portion into the blanket. The pumps 162 have been selected to maintain a flow rate of at least 15 gallons per minute through the irradiators 160 under the most adverse operating conditions.

The drum irradiators 160a and 160b are designed for irradiating can-packed materials and are readily shown in Figures 5 through 8 of the drawings. The drum irradiator comprises a hexagonal drum 166 having parallel tubes 168 disposed therethrough in a triangular lattice. An inlet manifold 170 is provided near the top of the drum 166 for the irradiating fluid and a manifold outlet 172 is disposed near the bottom for removal of the fluid. Within the drum 166 are baffle plates 174 having apertures 176 therein for receiving the tubes 168 and are shaped to conform to the cross section of the drum 166 except for one shortened side 178 which permits the flow of fluid downward to the next level formed by a baffle plate 174 immediately below. The baffle plates 174 are arranged so that the short sides 178 are alternately disposed adjacent to opposite sides of the hexagonal drum 166 causing the fluid to flow back and forth across the drum 166 as it flows from the inlet 170 down toward the outlet 172. Stiffener fins 180 surround the periphery of the drum 166 to give it needed support. Within the tubes 168 are can guides 182 spaced from said tubes 168 and having flutes 184 so that cans 186 are spaced from said guides. A cooling fluid may thus be introduced into the space between the can and the can guide to maintain the material in the cans at a desired temperature, the space between the can guide and the tube 168 acting as an insulator therebetween.

Figure 6:
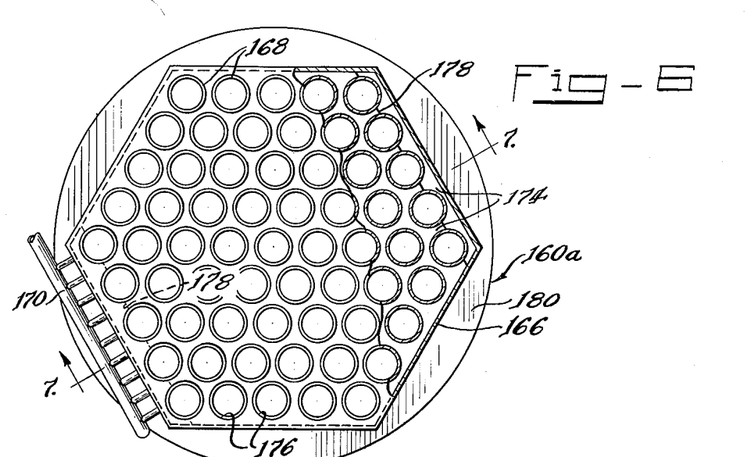
Figure 6 is a horizontal plan view of one of the irradiation drums.
Figure 7:
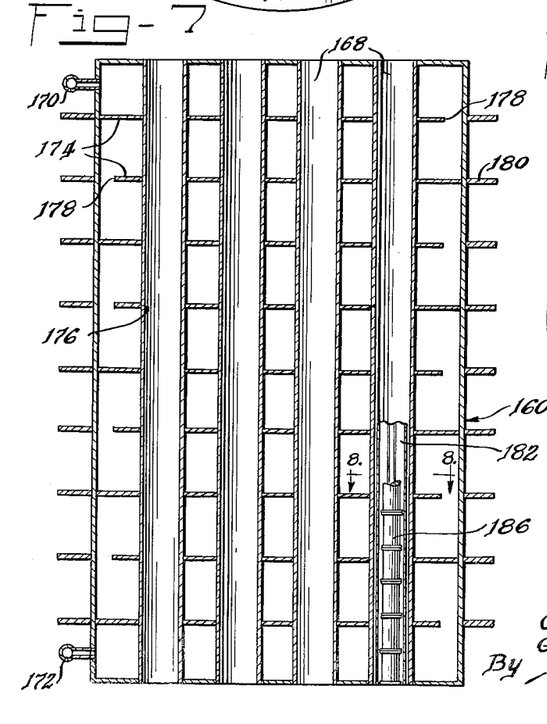
Figure 7 is a vertical sectional view taken along the line 7—7 of the irradiation drum shown in Figure 6.
Figure 8:
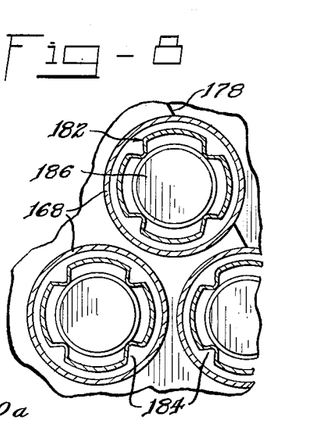
Figure 8 is a horizontal sectional view taken along the line 8—8 of Figure 7.

In the particular reactor system described, drum irradiators for irradiating No. 2 and No. 10 size cans are used. The No. 2 can irradiator 160a has 61 tubes 168 measuring 68" long which will hold 15 stacked cans in a hexagonal drum measuring 39.66" across parallel sides. The No. 10 can irradiator 160b has 19 parallel tubes 168 measuring approximately 61" long for stacking ten cans, the drum measuring 38.3" across parallel sides.

Figure 5:
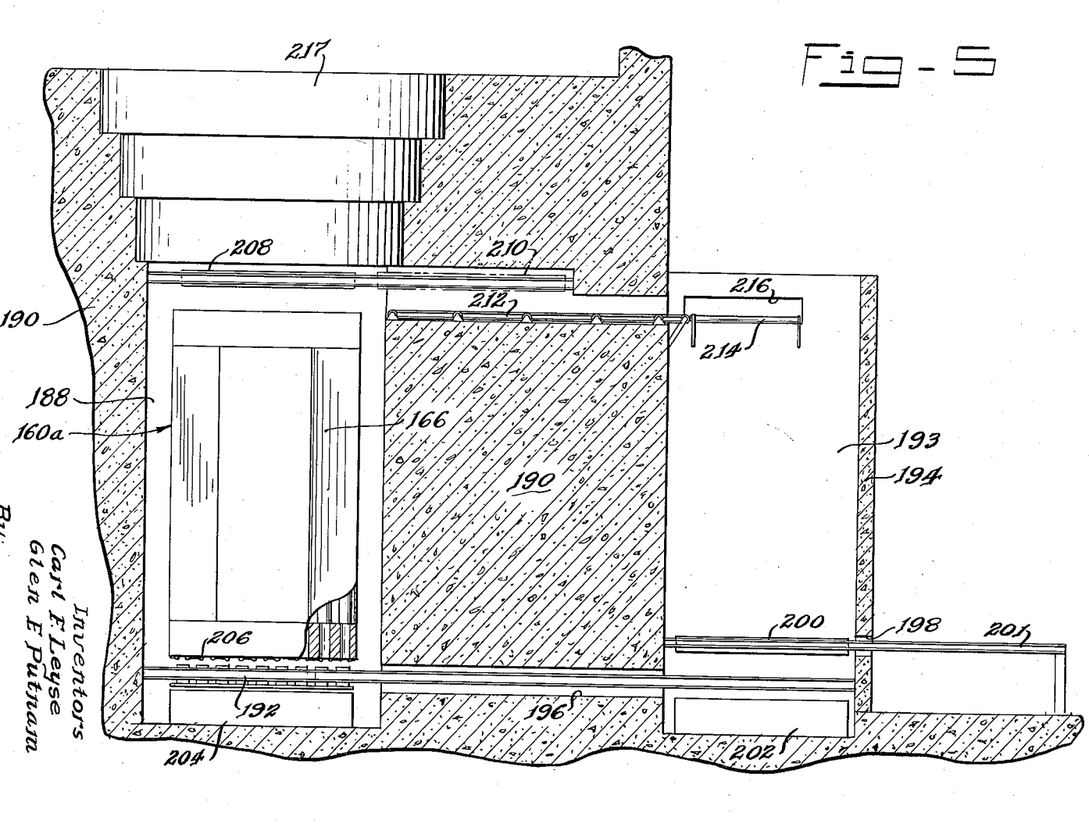
Figure 5 is a vertical sectional view of one of the drum-type irradiation facilities in a reactor system.

A drum radiator installation is shown in Figure 5 wherein the drum radiator 160a is disposed within a cubical 188 formed by the radiation shield 190. A can carrier 192 is transportable between the cubical 188 and a space 193 formed between the radiator shield 190 and an auxiliary shield wall 194 through passageway 196 whereby the cans of material to be irradiated may be introduced to a position below the drum radiator 160a. A passageway 198 is located in the auxiliary shield wall 194 at a level above the primary shield passageway 196 through which a can loading pallet 200 may be moved from the can loading position 201 outside of the shield wall 194 into a position within the shielded space 193 where the cans may be transferred to the can carrier 192. The cans are loaded into the can-loading pallet 200 in an array corresponding to the disposition of the tubes 168 in the drum irradiator 160a and moved into the space between the primary shield 190 and the shield wall 194 where a can-loading mechanism 202 lowers the cans unto the can carrier 192 without disturbing the array. The can carrier 192 is then transported into the cubical 188 below the drum irradiator 160a where suitable piston means 204 raise the cans into the tubes 168 where they are held in place by spring loaded pawls 206. Each load of cans introduced into the bottom of the drum irradiator 160a forces the cans within the irradiator one step up until they reach the top of the drum irradiator where they are lifted therefrom by a magnetic pick-up head 208 and moved to position 210 within the primary shield 190 where they are released to a conveyor belt 212. The belt 212 transports the irradiated cans to the space 193 between the two shields 190 and 194 where they are deposited on a second conveyor belt 214 and carried outside the shielded space through the slot 216. Access to the cubical 188 is had by removing the shield slabs 217 above the drum irradiator for any necessary servicing. A similar irradiation facility is used for irradiating No. 10 size cans in the drum irradiator 162b.

Figure 9:
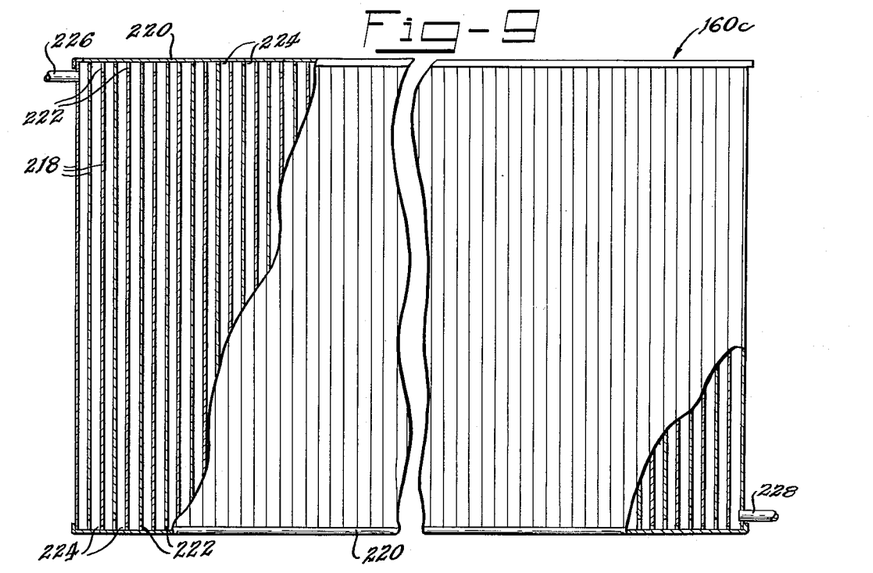
Figure 9 is an elevation view sectioned in part of one of the slab irradiators.
Figure 10:
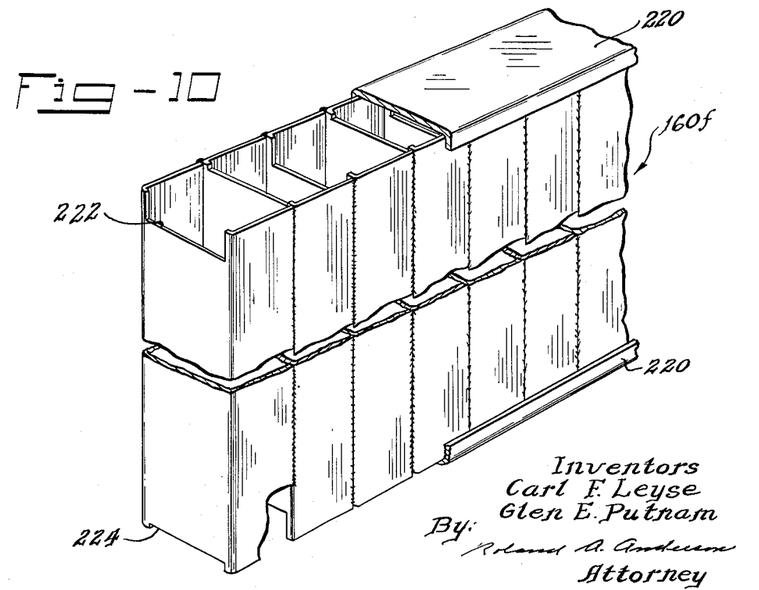
Figure 10 is an isometric view of part of the slab irradiator shown in Figure 9.

A slab-type irradiator useful for irradiating selected materials in odd and varied shapes is shown in Figures 9–10. The slab irradiator 160c is constructed of a series of U-shape channel members 218 assembled and welded, as shown in Figure 10 with cover plates 220 closing the top and bottom ends of the assembly. Each of the channel members 218 has a large passageway 222 at one end with a smaller passageway 224 at its other end, the channel members 218 being assembled so that alternate ones have their large passageways 222 at the upper end. An inlet 226 is provided near the top of one end of the irradiator 160c and an outlet 228 is located near the bottom of the opposite end so that the irradiation fluid will flow in an up and down path through a slab irradiator.

Figure 11:
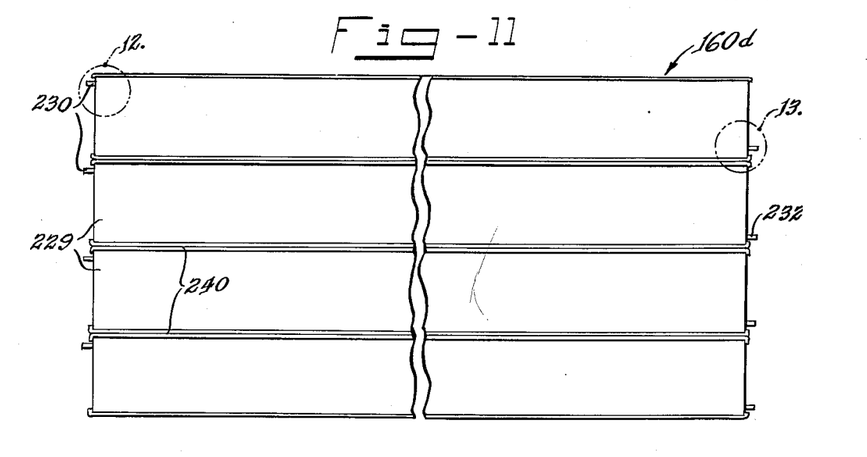
Figure 11 is an elevation view of the other slab irradiator.
Figure 12:
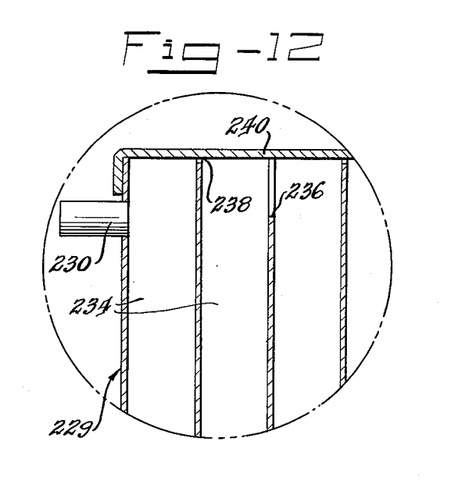
Figure 12 is a vertical section view of the portion circled and denoted 12 in Figure 11.
Figure 13:
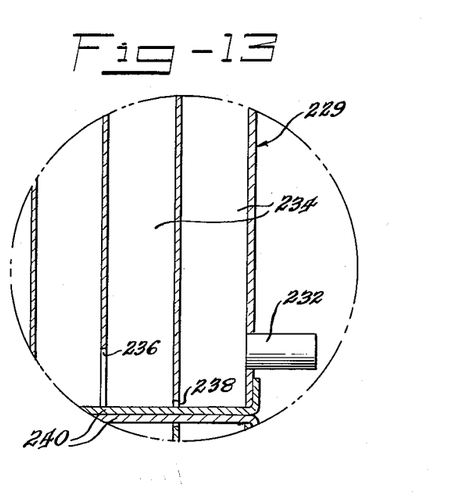
Figure 13 is a vertical section view of the portion encircled and denoted 13 in Figure 11.

The slab irradiator 160d, as shown in Figs. 11 through 13, is designed primarily for irradiating selected matter packed in boxes and is essentially four irradiators, such as 160c, stacked in layers 229, and each having its own inlet 230 and outlet 232. Each layer 229 comprises an assembly of welded U-shaped channel members 234 having larger and smaller passageways 236 and 238, respectively, at opposite ends of the channel members 234 oppositely arranged so that the fluid will flow through the layers 229 in an essentially up and down path. Each layer 229 has its own upper and lower plate cover 240 for closing the exposed portions of the assembly.

The irradiators 160c and 160f are merely straight tubes having different diameters to provide for low dose irradiations when other irradiators are in use with the reactor when it is operating at relatively high power. They do not have separate pumping means but are designed to operate off of the pump used for the slab irradiator 160c.

The particular reactor described in this specification as one embodiment of the invention has a designed maximum power rating of 20 megawatts, producing approximately $68.3 \times 10^6$ b.t.u./hr. of heat. The normal operating power of the reactor is 10.5 megawatts which makes available approximately 7 kilowatts of gamma energy to be absorbed in the selected materials to be irradiated. The production rate of the system is 3000 lbs./hr. irradiated to a dosage of about $2 \times 10^6$ rep (roentgen equivalent physical). The following table summarizes useful data for the reactor system operating at the stated performance requirements:

*Data summary*

| Core: | | |
|---|---|---|
| Equivalent diameter | in | 14.9 |
| Height | in | 36 |
| Volume | in.³ | 6,276 |
| Metal-to-water ratio (average) | | 0.7 |
| U²³⁵ content of new clean core | kg | 11.4 |
| Cold, clean, critical mass (uranium) | kg | 6.0 |
| Power density (20 mw.) | kw./liter | 194.5 |
| Cold, clean, excess reactivity | Percent ΔK/K | ~12 |

| | Fuel Core | Overall |
|---|---|---|
| Fuel Assemblies: | | |
|   Fuel plates per assembly | | 16 |
|   Number of fuel assemblies | | 24 |
|   Uranium (90–95% U²³⁵) per assembly_grams | | 475 |
|   Metal-to-water ratio | | 0.58 |
| Control Rods: | | |
|   Number— | | |
|     Shim-safety rods | 5 | |
|     Regulating rods | 2 | |
|   Travel— | | |
|     Shim-safety rods _____ in | 36 | |
|     Regulating rods _____ in | 24 | |
|   Worth of shim-safety rods— | | |
|     4 blades, total _____ Percent ΔK/K | 8–13 | |
|     1 cruciform _____ Percent ΔK/K | 12–14 | |

*Heat transfer and flow data for 20 mw.-operation*

| | | |
|---|---|---|
| Nominal operating pressure | p.s.i.a | 165 |
| Coolant inlet temperature at reactor | °F | 133 |
| Coolant outlet temperature at reactor | °F | 190 |
| Total coolant flow through reactor | g.p.m | 2,420 |
| Number of passes in core | | one |
| Heat transfer area in core | ft.² | 407 |
| Coolant flow rate through core | g.p.m | 2,280 |
| Coolant velocity through core | ft./sec | 7.5 |

Indium system

| | No. 2 Cans | No. 10 Cans |
|---|---|---|
| Drum Radiators: | | |
| Number | 1 | 1 |
| No. of tubes | 61 | 19 |
| No. of cans per tube | 15 | 10 |
| Total number of cans | 915 | 190 |
| Weight of material (unit density)___lb | 1,225 | 1,310 |
| Dwell time (3,000 lb./hr.)___min | 24.5 | 26.2 |
| Reactor power (3 ton-megareps/hr.)___mw | 10.3 | 11.6 |

| | Single-Slab | Multiple-Slab |
|---|---|---|
| Slab Radiators: | | |
| Number | 1 | 1 |
| Number of units in radiator | 1 | 4 |
| Dimension of each unit slab___in | 3 x 84 x 108 | 3 x 20 x 108 |
| No. of boxes | 40 | 10 per unit |
| Weight of material in boxes (unit density)___lb | 2,760 | 690 |
| Dwell time (3,000 lb./hr.)___min | 55.5 | 13.9 |
| Reactor power (3 ton-megarep/hr.) mw | 6.1 | 12.2 |

While the invention has been described with reference to a particular embodiment thereof it is the intent of the applicants that their invention should not be limited thereby but should be limited only by the scope of the appended claim.

What is claimed is:

An apparatus for irradiating selected materials comprising: a neutronic reactor, said reactor comprising a cylindrically shaped active portion containing fuel elements highly enriched in thermal neutron fissionable material, said portion having its length substantially greater than its diameter, a pressure vessel enclosing the active portion, means for controlling the reactivity of said reactor, means for circulating a coolant through the pressure vessel past the active portion, an annular tank surrounding and spaced from the pressure vessel around the active portion having a volume approximately equal to the volume of the active portion, a fluid within said tank comprising an aqueous indium[115] sulphate solution of approximately 600 grams per liter concentration, a concrete shield having a reservoir containing said reactor, a second coolant disposed within the reservoir and covering the reactor, means for circulating said second coolant through the space between the annular tank and the pressure vessel; radiator means adapted to receive the selected materials, means for flowing said indium[115] sulphate solution from said tank to said radiator means at a flow rate of at least 15 gallons per minute whereby the selected materials are subjected to radioactive emissions released by said solution, means for returning said solution to said reservoir, and means for cooling a portion of said indium sulfate solution comprising heat exchange means and means for flowing a portion of said solution from said tank to the heat exchange means and returning the solution to the tank.

References Cited in the file of this patent

UNITED STATES PATENTS

| 2,708,656 | Fermi et al. | May 17, 1955 |
| 2,743,225 | Ohlinger et al. | Apr. 24, 1956 |
| 2,815,321 | Wigner et al. | Dec. 3, 1957 |
| 2,860,093 | Wigner et al. | Nov. 11, 1958 |

OTHER REFERENCES

General Electric: "Chart of the Nuclides," 4th edition, November 1952.

Unbehoun A.E.C.D.-3712, Apr. 15, 1953, Technical Information Extension, Oak Ridge, Tenn., pp. 15–24, 44–47, 53.

Manawitz: Nucleonics, vol. 11, No. 10, Oct. 1953, pp. 18–20.

Brownell et al.: A.E.C.U.-3050, May 1955, Technical Information Service, Oak Ridge, Tenn., pp. 5–9.

Glasstone: "Principles of Nuclear Reactor Engineering," pp. 28, 172–174, July 1955, D. Van Nostrand Co., Inc., New York.

Baker and Adamson Radiochemicals, General Chemical Division of Allied Chemical Corp., New York, N.Y., 1955, pp. 14, 15.

Brownell et al.: T.I.D.-8002, Jan. 1956, Technical Information Service, Atomic Energy Commission, Washington 25, D.C., pp. 1–3.

Siu et al.: Vol. 15 of Proceedings of the International Conference on the Peaceful Uses of Atomic Energy, United Nations, New York, 1956, page 271.